US008456450B2

(12) United States Patent
Land et al.

(10) Patent No.: US 8,456,450 B2
(45) Date of Patent: Jun. 4, 2013

(54) SYSTEMS AND METHODS FOR IMPEDANCE STABILIZATION

(75) Inventors: Brian Land, Redwood City, CA (US); Steven P. Hotelling, San Jose, CA (US); Gus Pabon, Cupertino, CA (US); Benjamin B. Lyon, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1150 days.

(21) Appl. No.: 11/823,915

(22) Filed: Jun. 28, 2007

(65) Prior Publication Data
US 2009/0002343 A1 Jan. 1, 2009

(51) Int. Cl.
*G06F 3/041* (2006.01)

(52) U.S. Cl.
USPC .......................................... 345/178; 323/363

(58) Field of Classification Search
USPC .................... 345/173–178; 323/363
See application file for complete search history.

(56) References Cited

U.S. PATENT DOCUMENTS

| 5,783,875 | A | * | 7/1998 | Jaros ............................ 307/116 |
| 6,535,147 | B1 | * | 3/2003 | Masters et al. .................. 341/34 |
| 6,856,103 | B1 | | 2/2005 | Hudson et al. |
| 2006/0095745 | A1 | * | 5/2006 | Tran ............................ 712/238 |
| 2006/0147062 | A1 | | 7/2006 | Niwa et al. |

FOREIGN PATENT DOCUMENTS

| CN | 1881769 A | * | 12/2006 |
| CN | 1 881 769 | | 12/2009 |
| JP | 2006/164925 | | 6/2006 |
| JP | 2006/174187 | | 6/2006 |
| JP | 2006164925 A | * | 6/2006 |
| KR | 2004/0058531 | | 7/2004 |
| KR | 2006 0055027 | | 5/2006 |
| WO | WO 00/30025 | | 5/2000 |
| WO | WO 2004/055997 | | 7/2004 |
| WO | WO 2004055997 A1 | * | 7/2004 |

OTHER PUBLICATIONS

International Search Report and Written Opinion of the International Searching Authority, or the Declaration, issued in International Application No. PCT/US2008/005485, mailed Mar. 2, 2009.
English Translation of Chinese Patent Application Disclosure CN 1 881 769.
English Translation of Chinese Patent Application Disclosure CN 1 881 769, Dec. 20, 2006.

\* cited by examiner

*Primary Examiner* — Kevin M Nguyen
*Assistant Examiner* — Kenneth B Lee, Jr.
(74) *Attorney, Agent, or Firm* — Womble Carlyle Sandridge & Rice LLP

(57) ABSTRACT

An AC-to-DC adapter may be provided in order to increase the sensitivity of a touch-sensitive surface. Such an AC-to-DC adapter may include a rectifying circuit to rectify incoming AC signals. The rectifying circuit may take the form of a diode bridge network that includes four diode branches. Stabilization circuits may be provided in parallel with each diode branch in order to decrease the impedance of the diode bridge network during particular periods of operation. The stabilization circuits may be configured such that the impedance of the diode bridge network is substantially constant during all periods of operation. As a result, the impedance of the AC-to-DC adapter may be relatively constant during all periods of operation. In turn, the sensitivity of a touch-sensitive surface of a device being powered by such an AC-to-DC adapter may increase.

16 Claims, 3 Drawing Sheets

SYSTEMS AND METHODS FOR IMPEDANCE STABILIZATION

BACKGROUND OF THE INVENTION

This invention relates to power regulation. More particularly, this invention relates to stabilizing the impedance of a power adapter.

Traditional AC-to-DC power adapters can rectify an AC power signal provided by a wall outlet in order to provide a DC power signal to a portable device. This DC power signal can provide power to a portable device regardless if the portable device is ON or OFF. If the portable device is OFF, the DC power signal can be utilized to recharge a battery of the portable device. If the portable device is ON, however, the DC power signal can be utilized to power the electronics of the portable device. Traditional AC-to-DC power adapters are deficient, however, as the impedance of traditional AC-to-DC power adapters change over time. Circuitry using DC power provided by traditional AC-to-DC power adapters can operate improperly as the impedance of the AC-to-DC power adapters change over time. It is therefore desirable to provide AC-to-DC power adapters with impedances that do not change over time.

SUMMARY OF THE INVENTION

An electronic device is provided with a capacitive touch-sensitive surface. The capacitive touch-sensitive surface may utilize a local system ground that is coupled to the housing of the electronic device. For example, a wireless telephonic device with a media playback capability may be provided with a capacitive touch-sensitive surface in the form of a touch-sensitive display screen. The housing of such a wireless telephonic device may be electrically conductive (e.g., a metal) and the local system ground node of the touch-sensitive display screen may be coupled to this electrically conductive housing. In doing so, a user's body may be electrically coupled to the local system ground node of the touch-sensitive surface in certain operational situations. Accordingly, a user may not only interact with a device to change the electrical characteristics of a touch-sensitive surface, but the user may also interact with a device to change the electrical characteristics of the device's local ground node.

An AC-to-DC adapter may be provided in order to increase the sensitivity of a touch-sensitive surface. Such an AC-to-DC adapter may include a rectifying circuit to rectify incoming AC signals. The rectifying circuit may take the form of a diode bridge network that includes four diode branches. Stabilization circuits may be provided in parallel with each diode branch in order to decrease the impedance of the diode bridge network during particular periods of operation. The stabilization circuits may be configured such that the impedance of the diode bridge network is substantially constant during all periods of operation. As a result, the impedance of the AC-to-DC adapter may be relatively constant during all periods of operation. In turn, the sensitivity of a touch-sensitive surface of a device being powered by such an AC-to-DC adapter may increase, for example, in situations where a user's body does not electrically couple to the local ground of the touch-sensitive device.

A transformer may also be included in the AC-to-DC adapter in order to step-down voltage signals such that a device that utilizes the transformer is provided with manageable levels of voltage. A capacitor may be coupled between an input winding and an output winding of the transformer in order to filter out noise that may degrade the sensitivity of a touch-sensitive sensor coupled to the output winding of the transformer.

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE INVENTION

Figure 1:
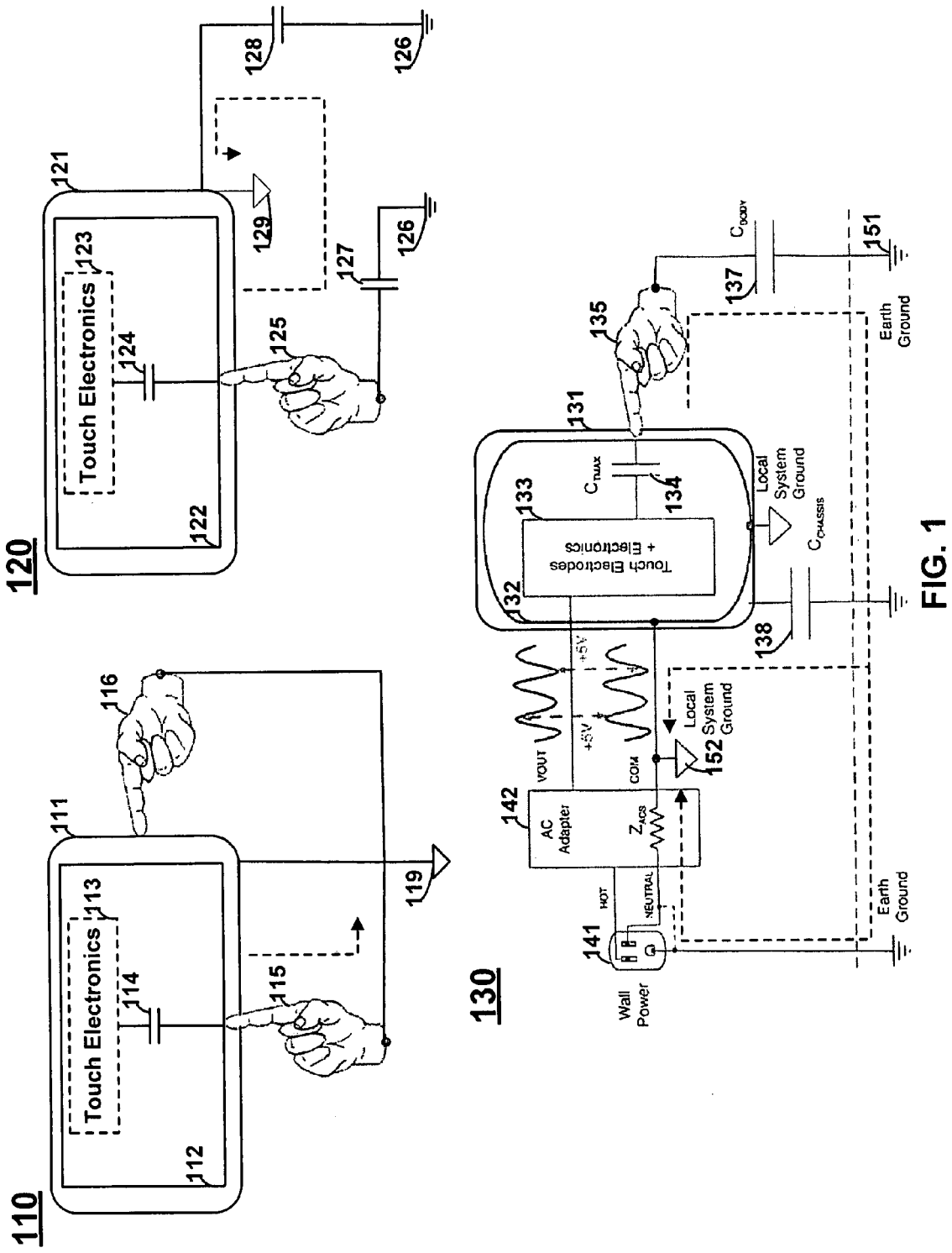
FIG. 1 is an illustration of various operational situations for a touch-sensitive surface constructed in accordance with an embodiment of the present invention.

FIG. 1 shows operational environment 110 for a touch-sensitive device when body part 115 interacts with touch-sensitive surface 112 and body part 116 interacts with housing 111 of the touch-sensitive device. Circuitry 113 may be included in order to control the operation of touch-sensitive surface 112. Housing 111 may be electrically conductive (e.g., a metal) and may be electrically coupled to circuitry 113. For example, housing 111 may be coupled to a ground terminal of the touch-sensitive device.

Persons skilled in the art will appreciate that a device that includes a touch-sensitive surface may take many forms. For example, a touch-sensitive device may be a stationary device or a portable device. A stationary device may be, for example, a laptop, server, or personal computer that includes a non-display interface, such as a trackpad, and/or a touch-sensitive display screen. A portable device may be, for example, a portable telephonic device, capable of playing different forms of media, that includes a non-display interface, such as an input wheel, and/or a touch-sensitive display screen.

Touch-sensitive surface 112 may be, for example, a capacitive touch-sensitive display. Touch-sensitive surface 112 may be operable to determine a single-point of contact (e.g., a single finger interacting with the display) or multiple points of contact (e.g., two or more fingers interacting with the display). Touch sensitive surface 112 may include a number of sensing capacitors that are coupled to ground when a user interacts with the sensing capacitors.

A sensing capacitor may be configured such that the capacitance of the sensing capacitor, $C_T$, is proportional to the magnitude of touch applied to the sensing capacitor by a user. The sensing capacitor may be configured such that the capacitance of the sensing capacitor changes when a body part of a user is within at least a particular proximity to the sensing capacitor, but yet does not directly, physically touch the touch-sensitive surface.

A sensing capacitor may be configured such that if a user's body part (e.g., a finger) is far from the touch-sensitive surface, the capacitance of the sensing capacitor, $C_T$, is small or near zero. As the body part approaches the touch-sensitive surface, the capacitance of the sensing capacitor, $C_T$, may increase. When a body part is fully pressed against the touch surface, the capacitance of a sensing capacitor, $C_T$, may reach a maximum capacitance, $C_{TMAX}$.

Persons skilled in the art will appreciate that when a body part of a user (e.g., a finger or toe) interacts with a sensing capacitor, the user's body part couples that sensing capacitor to the user's body. A sensing capacitor may be part of a touch-sensitive sensor that may include, or may be utilized by, circuitry 113.

Accordingly, the capacitance of a sensing capacitor, $C_T$, may be dependent on the type and quality of ground and power sources utilized by the touch-sensitive surface. Circuitry 113 may be powered by a number of sources of electrical energy. For example, circuitry 113 may be powered from a battery or a power outlet. Circuitry 113 may be configured to accept DC power and, as such, an AC-to-DC power adapter may be utilized, in conjunction with a wall outlet, to provide power to circuitry 113 as well as any other structure in the device containing circuitry 113.

While operating in operational environment 110, circuitry 113 may be powered by a battery. In operational environment 110, a user may be holding housing 111 in one hand and may be interacting with touch-sensitive surface 112 with the other hand. In doing so, an electrical short may be effectively created between housing 111 and the body of the user. Housing 111 may be coupled to local system ground 119. In this manner, the user may be grounded to local system ground 119 through housing 111. Accordingly, when a user places a finger fully on touch-sensitive surface 112, sensing capacitor 114 may be coupled to local system ground 119 and the capacitance of sensing capacitor 114 may be at a maximum capacitance, $C_{TMAX}$ (e.g., 7 pF). Persons skilled in the art will appreciate that the output of the sensor that includes a sensing capacitor may be more appropriately described as $O_c = K \cdot C_{TMAX}$, wherein K is a constant.

Operational environment 120 may include touch-sensitive surface 122, housing 121, circuitry 123, and sensing capacitor 124. Operational environment 120 may occur, for example, when a user is interacting with surface 122 via body part 125, but the user is not interacting with housing 121. Such an environment may occur, for example, when a user is wearing a glove on one hand and is holding the device with that gloved hand. Such an operational environment may also occur, for example, when the device is placed on a non-conductive table and the user does not touch housing 121. Operational environment 120 may also occur, for example, when a device is covered in a non-conductive material (e.g., a rubber or a silicone), the local ground of a device is not coupled to the housing, or the housing is non-conductive. Similar to housing 111 of operational environment 110, housing 121 may be coupled to local system ground 129. In operational environment 120, circuitry 123 may be powered by a battery.

As a body part of the user is not touching housing 121 in operational environment 120, the user's body is not able to couple to local system ground 119. Accordingly, when body part 125 interacts with sensing capacitor 124 of surface 122, sensing capacitor 124 is coupled to an earth ground via the user's body capacitance (e.g., ~150 pF). The device may be configured, however, to utilize the same circuitry regardless of the type of ground sensing capacitor 124 confronts. Accordingly, circuitry 123 and sensing capacitor 124 may operate transparently as to whether sensing capacitor 124 is coupled to earth ground 126 or local system ground 129.

Earth ground 126 and local system ground 129 may differ in voltage. In such an instance, the capacitance of sensing capacitor 124 utilizes the shortest impedance path to local system ground 129. In other words, the output of sensing capacitor 124 is proportional to the total capacitance seen from the touch electronics (e.g., sensing capacitor 124), through the user's body, into earth ground 126, and then back into local system ground 129. Accordingly, the path may include the capacitance of sensing capacitor 124 ($C_T$), the capacitance of the user's body ($C_{BODY}$), and the capacitance of housing 121 ($C_{HOUSING}$). Put another way, the total effective capacitance, $C_{Teffective}$, seen by sensing capacitor 124 may be $1/C_{Teffective} = (1/C_{TMAX}) + (1/C_{BODY}) + (1/C_{HOUSING})$ when body part 125 is fully pressed against surface 122. Accordingly, the signal output may be proportional to the total effective capacitance, $C_{Teffective}$. As such, the signal output may be $O_{Ceffective} = K \cdot [C_{TMAX} \cdot C_{BODY} \cdot C_{HOUSING}) [C_{TMAX} \cdot C_{BODY} + C_{TMAX} \cdot C_{HOUSING}) + (C_{HOUSING} \cdot C_{BODY})]]$.

Persons skilled in the art will appreciate that the capacitance of a user's body is large with respect to the maximum capacitance of a sensing capacitor and, as a result, may have a relatively smaller effect on the net signal output from the sensing capacitor. The capacitance of the housing in operational environment 120 may reduce the signal output from the sensing capacitor. However, the capacitance of the housing in environment 120 (e.g., ~15 pF) may be stable such that any reduction in the signal output from the sensing capacitor is also stable.

Accordingly, circuitry may be included that is operable of detecting operational environment 120 (e.g., by noting a change of the average capacitance when a user interfaces with the touch-sensitive surface) and appropriately scaling the output capacitance of a sensing capacitor to take into account the reduction in capacitance from the housing. Such a change may also be performed, for example, in software. More particularly, the output of a sensing capacitor may be provided to a processor. This processor may then perform a number of operations on the output of the sensing capacitor. Such operations may include filtering out interference as well as, for example, scaling the capacitance based on the working environment of the device (e.g., environment 120).

Persons skilled in the art will appreciate that the effective capacitance, $C_{Teffective}$, may be, in some environments, approximately 30-40% (e.g., 34%) less than the maximum capacitance of a sensing capacitor, $C_{TMAX}$. As mentioned above, the reduction is stable across, for example, the modulation frequency utilized to operate the touch-sensing components. Accordingly, this reduction may be considered to be independent from the modulation frequency of the touch-sensing components, which may include circuitry 123 and capacitor 124. Capacitor 124 may be provided as part of a sensor that circuitry 123 receives signals from and controls.

In order to correct for any reduction between the effective capacitance, $C_{Teffective}$, and the maximum capacitance of a sensing capacitor, $C_{TMAX}$, scaling may be provided. For example, scaling may be provided in order to increase a sensor output by a particular amount (e.g. 40%-70%). Additionally, the type of environment that a device is operating in may be detected by that device. For example, a device may determine when it is not physically connected to an AC-to-DC power adapter. In such a situation, the output of the touch sensor may be scaled upward to adjust for any reduced sensitivity of the touch-sensor. As per another example, the device may be configured to include a non-conductive housing. Alternatively, the device may be able to determine that a user is not touching the housing of the device. The device may then scale the output of the touch sensor appropriately for this environmental situation. Another environmental situation may be, for example, when a user is not touching the local system ground of a device and when an AC-to-DC power adapter is not present. Yet another environmental situation may be, for example, when an AC-to-DC power adapter is being utilized to power the device. Persons skilled in the art will appreciate that a number of different scaling techniques may be utilized depending on the environmental situation that is detected.

Operational environment 130 may be utilized to operate a device with circuitry 133, sensing capacitor 134, surface 132, and housing 131. Wall output 141 may be utilized to power the components of the device. AC-to-DC adapter 142 may be utilized to, for example, rectify the power received from wall output 141 and step the voltage of this power down to a desired amount (e.g., approximately 5 volts).

AC-to-DC adapter 142 may be, for example, a three-prong or two-prong AC-to-DC adapter. In a two-prong configuration, the voltage and neutral contacts of wall outlet 141 may be coupled to AC-to-DC adapter 142. In a three-prong configuration, the voltage, neutral, and ground contacts of wall outlet 141 may be coupled to AC-to-DC adapter 142. The ground contact may, for example, provide a ground contact to a device. In turn, a device may couple the housing (and local system ground) to such a ground contact while the AC-to-DC adapter is providing power to the device. AC-to-DC adapter 142 may include any type of jack to interface with a device such as, for example, a Universal Serial Bus (USB) jack or a four-region jack.

AC-to-DC adapter 142 may include internal switching circuitry that generates common-mode voltage swings that are relative to earth ground. Additionally, AC-to-DC adapter 142 may have a varying impedance. AC-to-DC adapter 142 may have a fixed or variable switching frequency. Circuitry may be provided in an AC-to-DC adapter, or in a device having a touch-sensitive surface, in order to improve the capacitance and impedance of an adapter or touch-sensitive device of varying configurations.

Persons skilled in the art will appreciate that a two-prong adapter may provide a DC signal that is isolated from earth ground as the adapter may only receive and utilize the neutral and voltage contacts of a wall outlet (e.g., as depicted in environment 130).

Power adapters may include a variety of internal switching structures to control, for example, the switching of inductors and/or transformer windings located within the power adapters. Such power adapters may be configured to provide a regulated output that provides a constant differential voltage. For example, such power adapters may be configured to provide an output differential voltage of +5 volts. Accordingly, at any moment in time, the voltage output of the power adapter may be, for example, 120 volts while the common output of the power adapter may be 115 volts such that a +5 volt voltage differential is supplied.

Adapters may be provided that provide differential voltages that maintain a steady differential, but that provide fluctuating common and voltage outputs. For example, an adapter may momentarily provide 110 volts and 105 volts on its voltage and common output contacts at one instance, but may provide 105 volts and 100 volts on its voltage and common output contacts at another instance. Accordingly, the voltage and common outputs of a power adapter may fluctuate yet the differential may be stable.

The local system ground of a device may be coupled to a common output of a power adapter, regardless of whether the power adapter is providing a common output voltage equal to earth ground. Accordingly, although the touch-sensitive device may be provided with a desired differential voltage (e.g., +5 volts), the local system ground may receive a voltage not equal to earth ground. Similarly, the local system ground may receive a voltage that varies over time. In this manner, the local system ground for a touch-sensitive device may move in voltage relative to earth ground.

A body part of a user (e.g., a finger) may have a strong reference to earth ground through the capacitance of the user's body. For a touch-sensitive device receiving power through an AC-to-DC power that provides a steady differential voltage with varying common and output voltages, a user's body part may not move with the same swings as the differential voltage with respect to ground. Accordingly, interference may be introduced in the touch-sensitive device as a user's finger maintains the same electrical characteristics while the local system ground (and/or the power voltage) of the touch-sensitive device changes over time. In other words, a user's finger may inject noise into a touch-sensitive device as a power adapter's ground (e.g., common output) moves relatively to earth ground. Such a situation may be present in environment 130. Here, body part 135 may touch display screen 132 and housing 131 may not be coupled to the user's body capacitance through a body part. Accordingly, AC-to-DC adapter 142 may regulate the voltage from power outlet 141 and may provide a stable, differential voltage with varying voltage and common outputs to the circuitry (e.g., circuitry 133) of the touch-sensitive device. Accordingly, body part 135 may connect capacitor 134 to earth ground through the body capacitance of the user and two parallel paths may be provided back to local system ground 152. One such path may be provided through housing capacitance 138. Another such path may be provided through the series impedance from power line input to load output of AC-to-DC adapter 142, $Z_{ACS}$.

In environment 130, the total effective capacitance seen by circuitry (e.g., circuitry 133) of capacitor 134 when the sensor is fully pressed may be, for example, $1/(j*w*C_{Teffective})=[1/(j*w*C_{TMAX})]+[[Z_{ACS}*(1/j*w*C_{HOUSING})]/[Z_{ACS}+(1/j*w*C_{HOUSING})]]$. Persons skilled in the art will appreciate that in some embodiments $Z_{ACS}$ may be less than $1/j*w*C_{HOUSING}$. This may occur because, for example, the impedance path through AC-to-DC adapter 142 may be the dominant impedance path. In such a situation, the effective capacitance seen in capacitor 134 may become $1/(j*w*C_{Teffective})=1/(j*w*C_{TMAX})+Z_{ACS}$. The output signal from a sensor that utilizes capacitor 134 may then be, for example, $K*C_{Teffective}$. Persons skilled in the art will appreciate that the constant K may be dependent upon the functionality and structure of a sensor that utilizes capacitor 134 to provide a touch-sensitive capability to a surface of a device. Additionally, the impedance through an adapter (e.g., the $Z_{ACS}$ of AC-to-DC adapter 142) may be capacitive or inductive. The impedance may be dependent on the structure of a particular adapter and a particular frequency of interest (e.g., sampling or modulation frequencies).

As shown above, the signal output of a sensor utilizing a capacitor in environment 120 may be reduced with respect to environment 110. In environment 130, the impedance of the power adapter may be reduced since this impedance is in series with the capacitance of capacitor 134. However, the grounding return path of the electrical loop created by the contact of a body part to the touch-sensitive surface is through the impedance of the adapter. Accordingly, the relationship of the output of a touch sensor and the impedance of the adapter may be monotonic in nature. In other words, as the impedance of the adapter increases, the output of a touch sensor including capacitor 124 may decrease. The device may determine that such a situation is similar to when a user's finger is being lifted from the touch-sensitive surface.

Circuitry may be added to either power adapter 142, wall output 141, or a touch-sensitive device to stabilize the impedance of the adapter, $Z_{ACS}$, as a function of time. In doing so, the sensitivity of the touch-sensitive surface may be increased. Similarly, circuitry may be added to either power adapter 142, wall output 141, or a touch-sensitive device to decrease the impedance of the adapter, $Z_{ACS}$, as a function of time. In decreasing the impedance of the adapter, the sensitivity of the touch-sensing surface that utilizes the adapter to regulate power may be increased.

Figure 2:
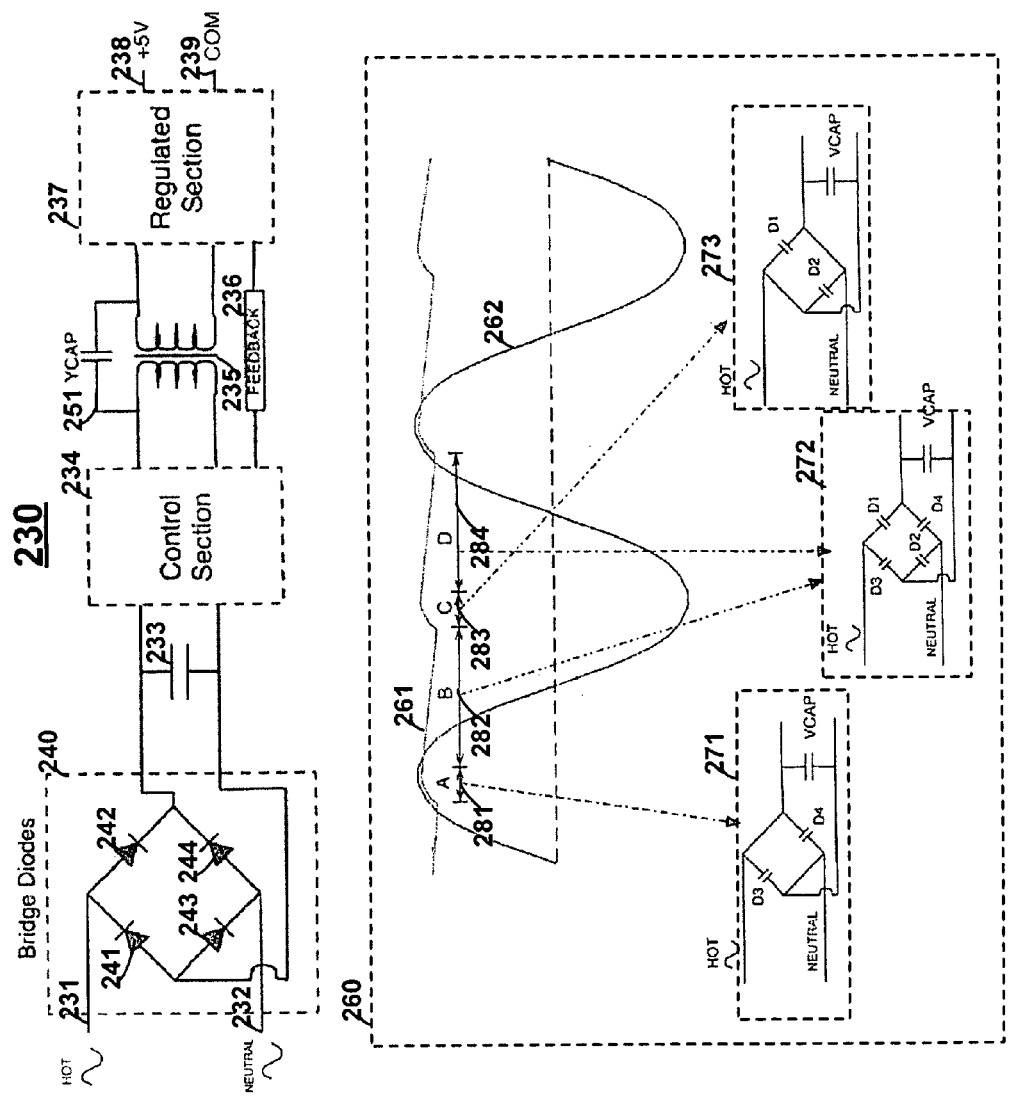
FIG. 2 is an illustration of a power adapter, which increases the sensitivity of a touch-sensitive surface powered by the power adapter, constructed in accordance with an embodiment of the present invention.

FIG. 2 shows AC-to-DC adapter 200 that may be utilized to provide power to a touch-sensitive device via voltage output 238 and common output 239. AC-to-DC adapter 200 may receive power from a wall outlet via input voltage node 231 and input common node 232. Circuitry 240 may be utilized to rectify a signal across capacitor 233. Control circuitry 230 may be utilized to provide a signal to transformer 235. Circuitry 237 may provide feedback control signals back to circuitry 230 or any other component of AC-to-DC adapter 200.

Circuitry 240 may be provided, for example, as a bridge diode network. Such a bridge diode network may rectify an AC waveform into a high-voltage DC signal. Control circuitry 234 may then switch the high-voltage DC down to a lower DC voltage using transformer 235. Persons skilled in the art will appreciate that transformer 235 may change the phase of a power signal as well as isolate a transformer's terminals from one another. In doing so, transformer 235 may isolate voltage input 231 and common input 232 from voltage output 238 and common output 239.

As previously discussed, common mode voltage swings, relative to earth ground, on the outputs of a power adapter may cause a touch-sensitive device to believe that a finger is touching a touch-sensitive surface with an amplitude similar to the common-mode voltage amplitude. Accordingly, such noise may be realized at, or near, the modulation frequencies of the circuitry utilizing a touch sensor. AC-to-DC adapter 200 or a touch-sensitive device may, for example, include circuitry or techniques to minimize the common-mode voltage amplitude at or near the modulation frequencies of the circuitry utilizing the capacitor to provide a touch-sensitive device. Additionally, AC-to-DC adapter 200 or a touch sensitive device may, for example, include circuitry or techniques to maintain low or stable impedance at, or near, the sampling frequencies e.g., baseband frequencies) of a capacitor utilized by touch-sensing circuitry. A sampling frequency may be, for example, a rate that usable samples are determined or a rate at which samples are obtained from a capacitor. In this manner, for example, a sampling frequency may be the rate at which averages of sub-samples, taken at a sub-sampling rate, are determined. Such average samples may then be utilized by additional circuitry to perform any number of operations.

The windings of transformer 235 may include parasitic capacitances that can provide a path to generate common mode voltage swings on voltage and common outputs 238 and 239. Such common mode voltages may be generated, for example, at the frequency that power is provided from a wall outlet (e.g., 50 or 60 Hz) or the frequency at which the switching components of AC-to-DC adapter 200 operates (e.g., circuitry 234). AC-to-DC adapter 200 may be configured to switch at frequencies higher than the frequency of power provided from a wall outlet in order to provide additional control of the circuitry of a power adapter.

A touch-sensitive device may include, for example, modulation, mixing, and filtering techniques to reject unwanted noise, such as noise created from varying common/voltages with respect to earth ground, at particular frequencies. For example, the touch-sensitive device may include structures and techniques for modulating, mixing, and/or filtering signals in order to reduce unwanted noise at frequencies outside a sensor's modulation frequency (e.g., touch-sensitive device 120 may include electronics 123 for modulating, mixing, and/or filtering signals in order to reduce unwanted noise at frequencies outside a sensor's modulation frequency).

External devices, such as AC-to-DC adapter 200, may include circuitry and techniques in order to reduce unwanted noise at frequencies near a sensor's modulation frequency. For example, AC-to-DC adapter 200 may include a capacitor between two terminals of transformer 235.

Capacitor 251 may be included and may be coupled between an input winding and output winding of transformer 235. Capacitor 251 may, in turn, reduce common mode noise at the switching frequencies of adapter 200. Capacitor 251 may include a capacitance approximately 1000 pF. Capacitor 251 may include a capacitance that is less than, or greater than 1000 pF.

Persons skilled in the art will appreciate that adaptive frequency hopping techniques may be provided in a touch-sensitive device. Such adaptive frequency hopping techniques may provide a touch sensor with the ability to signal at a variety of modulation frequencies. Adaptive frequency hopping techniques may also determine whether noise is present at a particular frequency and reduce any detected noise. Alternatively, the information contained in a frequency having noise may be discarded (e.g., not used) by a touch-sensitive device. Alternatively still, the frequency utilized to communicate information may be changed (e.g., hopped) to another frequency if noise is detected. Persons skilled in the art will appreciate that a frequency hopping technique may need a particular amount of information to operate. For example, a frequency hopping technique may be provided with a portion of a signal more than 60 kHz wide.

AC-to-DC adapter 200 may be configured to take into account a frequency hopping algorithm included in a touch-sensitive device. Particularly, for example, AC-to-DC adapter 200 may operate at a fixed frequency such that the switching frequency of AC-to-DC adapter 200 is at least the frequency that the frequency hopping algorithm utilizes to operate. Accordingly, for example, the switching frequency of AC-to-DC adapter 200 may be 60 kHz.

Additionally, in order to assist with a frequency hopping algorithm, AC-to-DC adapter 200 may be configured without a control loop that is able to skip switching at a particular moment in order to, for example, maintain regulation at particular loads (e.g., lights loads). Accordingly, AC-to-DC adapter 200 may be provided with switching that occurs at fixed time slots at a stated frequency.

AC-to-DC adapter 200 may also, for example, be configured in a variable frequency switching configuration such that the switching frequency of AC-to-DC adapter 200 changes during operation. The time scale of the frequency variation in an adapter may, for example, be configured to be slower than the time scale of a frequency hopping algorithm utilized for providing a touch-sensing functionality in a touch-sensitive device. For example, a variable frequency AC-to-DC adapter may be configured to operate below 500 kHz such that the switching frequency does not change more than 60 kHz over a period of one second. Similarly, for example, a variable frequency AC-to-DC adapter may be configured to operate above 60 kHz at all times. In this manner, a variable frequency AC-to-DC adapter may be configured to never switch at a frequency below the frequency slice utilized by a frequency hopping algorithm of a touch-sensitive functionality.

AC-to-DC adapter 200 may be configured such that AC-to-DC adapter 200 exhibits a relatively low and/or stable impedance at, or near, the sampling frequencies of a touch sensor. Persons skilled in the art will appreciate that touch sensors may be utilized to track the typical human motion. Accordingly, the range of the sampling rate of a touch sensor may be, for example, in the range of approximately 50 Hz to 125 Hz. Additionally, a touch sensor may exhibit a low-power mode with lower sampling frequencies (e.g., below approximately 50 Hz).

Circuit 240 may be provided in order to perform full-wave rectification of signals provided by a wall outlet. Circuit 240 may be a bridge diode network and may include diodes 241, 242, 243, and 244. The operation of such a bridge diode network is provided in operational environment 260.

Operational environment 260 shows the voltage of capacitor 233 over input 231 from the voltage contact of the wall outlet. Time period 281 corresponds to operational situation 271. Time periods 282 and 284 correspond to operational situation 272. Time period 283 corresponds to operational situation 273.

During time period 281, operational situation 271 may occur such that diodes 242 and 243 are conducting (e.g., forward-biased) and the capacitor at the output of the bridge network, capacitor 233, may see the full voltage amplitude of the signal the bridge network is receiving. As signal 262 reaches its peak, capacitor 261 charges up to this peak (e.g., minus forward voltage drops of diodes 242 and 243). During this situation, the effective impedance across diodes 242 and 243 may effectively be zero ohms. Put another way, diodes 242 and 243 may be the lowest impedance paths such that the total impedance across the bridge diode network is approximately near zero ohms.

During time periods 282 and 284, operational situation 272 may occur. Here, incoming waveform 262 may drop below its peak value. As a result, the voltage across capacitor 233 may be higher than the incoming voltage of waveform 262. In doing so, diodes 242 and 243 may turn OFF and become reverse-biased. In this manner, all of the diodes of the bridge network may be in a non-conductive state. The impedance of each diode may be seen as a capacitance. The total capacitance across the bridge network in operational situation 272 may be $4*C_{DR}$ (e.g., four capacitors in parallel), where $C_{DR}$ is the reverse capacitance of one of the diodes of the diode bridge network.

During time period 283, operational situation 273 may occur and may be similar to operational situation 271, but with opposite polarity. Particularly, signal 262 may have a relatively large, negative voltage where diodes 241 and 244 take a conducting state (e.g., forward-biased). In this manner, the diode bridge output places the full voltage amplitude of signal 262 on capacitor 233. Accordingly, capacitor 233 charges up to the peak voltage (e.g., minus the forward-biased diode drops). The total impedance across the diode bridge network may be approximately zero ohms.

The impedance across the diode bridge network may be considered $Z_{BRIDGE}$. The impedance of AC-to-DC adapter 200, $Z_{ACS}$, may be, for example, dominated by the impedance across the diode bridge network, $Z_{BRIDGE}$. Persons skilled in the art will appreciate that the impedance across the diode bridge network, $Z_{BRIDGE}$, may be added in series with the impedance of a touch-sensitive sensor and a user's body when the touch-sensitive sensor is pressed such that the total effective capacitance, $C_{Teffective}$, seen by the sensor in each timing region is as follows. For timing region 281 or 283, the total effective capacitance, $C_{Teffective}$, may be $1/C_{Teffective} = (1/C_{TMAX}) + (1/C_{BODY})$. For timing region 282 or 284, the total effective capacitance, $C_{Teffective}$, may be $1/C_{Teffective} = (1/C_{TMAX}) + (1/C_{BODY}) + (1/4*C_{DR})$.

Persons skilled in the art will appreciate that the output of a touch-sensitive sensor may be proportional to the total effective capacitance, $C_{Teffective}$. If the capacitance of a diode in reverse-bias is small enough then, for example, the value of the total effective capacitance may change in magnitude as the bridge diode network changes between timing regions. Such a change in impedance may happen, for example, twice per period of the power line signal, thus causing the touch sensor output to oscillate in amplitude at twice the frequency of the power supplied to AC-to-DC adapter 200.

In order to reduce such oscillations, AC-to-DC adapter 200 may be configured such that its series impedance does not abruptly change as a function of time.

Figure 3:
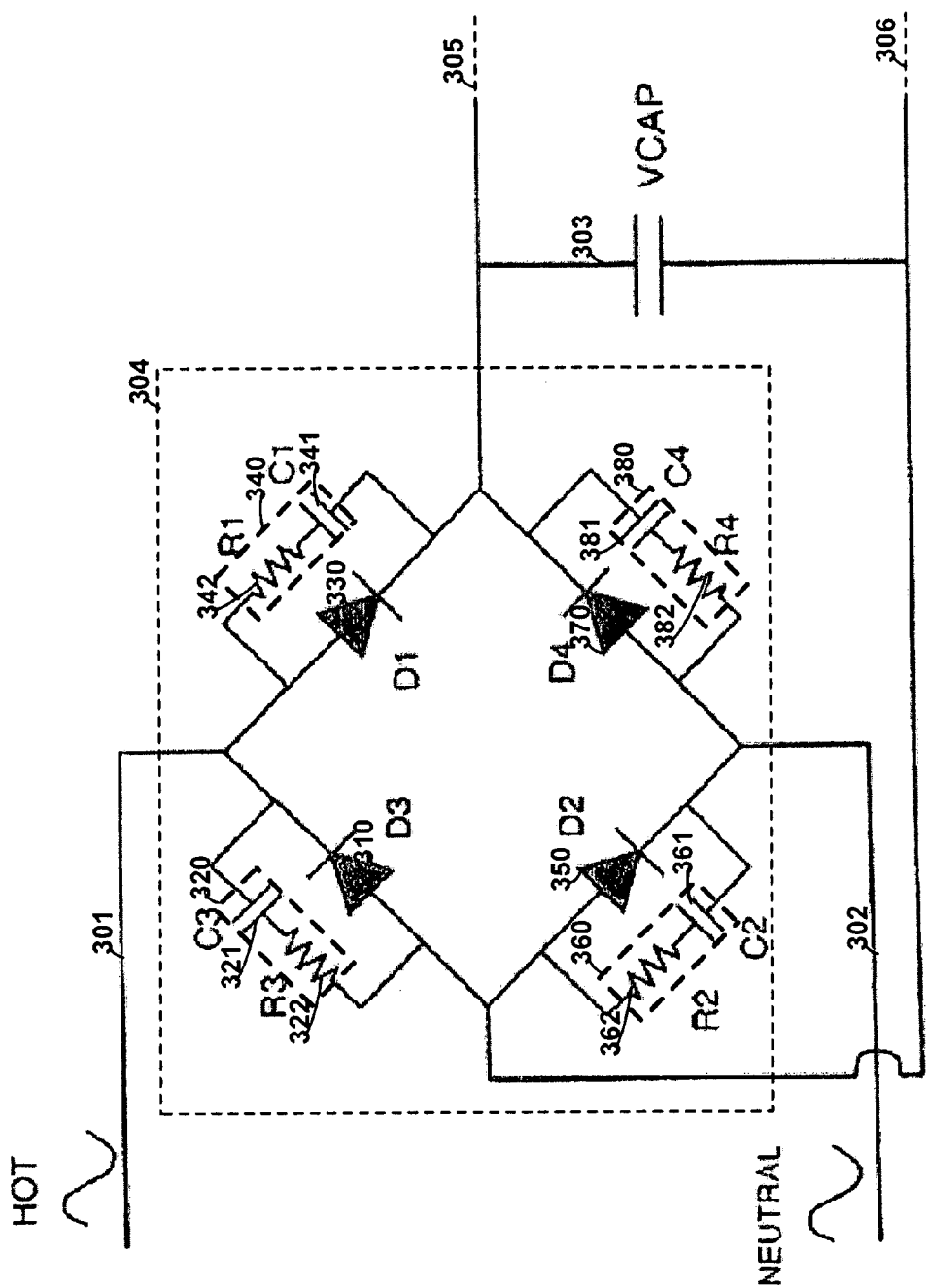
FIG. 3 is a diode network utilized in a power adapter, which increases the sensitivity of a touch-sensitive surface powered by the diode network, constructed in accordance with an embodiment of the present invention.

FIG. 3 shows circuit 300 that may include diode network 304, in which diodes 310, 330, 350, and 370 may be provided. Diode network 304 may receive inputs at input node 301 (e.g., a voltage contact from an AC-to-DC adapter) and input node 302 (e.g., a neutral contact from an AC-to-DC adapter). Diode network 304 may provide outputs to output node 305 and output node 306, which may be coupled across capacitor 303.

Persons skilled in the art will appreciate that diodes 310, 330, 350, and 370 may have relatively large reverse capacitances (e.g., approximately 100 pF or greater). Accordingly, the impedance across such a diode may remain low even when the diode stops conducting. As such, the net impedance change of a switching diode may be relatively low and may not adversely affect the output of a touch-sensor having a functionality based on a capacitive element. Additionally, the size of a diode may be fabricated relatively small in order to decrease reverse capacitance of the diode (e.g., on the micrometer scale).

The impedance of circuit 300 may also be stabilized. For example, stabilization circuits 320, 340, 360, and 380 may be utilized in circuit 300. A stabilization circuit may include a capacitor and a resistor coupled in parallel with the diode that the stabilization circuit is attempting to stabilize. The capacitance of the capacitor of a stabilization circuit, $C_{STABILIZE}$, may be, for example, larger than the reverse capacitance of the diode the stabilization circuit is attempting to stabilize. Accordingly, when the diode conducts, its impedance may be very low. Yet, when the diode is reverse-biased, its capacitance may be the capacitance of the diode, $C_{DR}$, in parallel with the capacitance from the capacitor of the stabilization circuit, $C_{STABILIZE}$.

If the capacitance of the capacitor in the stabilization circuit, $C_{STABILIZE}$, is larger than the capacitance of the diode, $C_{DR}$, for example, then the impedance of the diode and stabilization circuit may be smaller than the impedance of the diode without the stabilization circuit. Persons skilled in the art will appreciate that the capacitance of a capacitor in a stabilization circuit may be increased any amount until impedance for a particular diode and stabilization circuit is stabilized enough to sufficiently increase the sensitivity of a touch sensor.

A resistor may be added to a stabilization circuit. Particularly, for example, a resistor may be added in series with a capacitor of a stabilization circuit. Such a resistor may, for example, block noise at relatively high frequencies as well as assist with meeting electromagnetic interference (EMI) compatibility standards. A resistor used in a stabilization circuit may be chosen such that it exhibits relatively trivial levels of impedance relative to the impedance of the capacitor in the stabilization circuit at the frequency of the power being supplied to the power adapter utilizing circuit 300.

Diode 310 may utilize stabilization circuit 320, which may include resistor 322 and capacitor 321. Diode 330 may utilize stabilization circuit 340, which may include resistor 342 and capacitor 341. Diode 350 may utilize stabilization circuit 360, which may include resistor 362 and capacitor 361. Diode 370 may utilize stabilization circuit 380, which may include resistor 382 and capacitor 381. Capacitors 321, 341, 361, and 381 may, for example, have values of approximately 47 pF. Resistors 322, 342, 362, and 382 may, for example, have values of 2 kohms. Diodes 310, 330, 350, and 370 may, for example, each have reverse capacitances of approximately 13 pF.

The capacitance when the four diodes are reverse-biased may be, for example, 4×47 pF for the four capacitors and 4×13 pF for the reverse-biased diodes (e.g., which may total 240 pF). Persons skilled in the art will appreciate that impedance stabilizing components may be placed in a diode network of an AC-to-DC adapter, between the windings of a transformer in an AC-to-DC adapter, or anywhere in an AC-to-DC adapter or a touch-sensitive device. For example, components may be added to stabilize the impedance of an AC-to-DC adapter (from line to load), $Z_{ACS}$, under all operating conditions. If $Z_{ACS}$ is purely capacitive, for example, then $Z_{ACS}$ may equal $1/(jwC_{ACS})$. Accordingly, $Z_{ACS}$ may be configured, for example, to be less than or equal to $1/(jw(C_{BODY}))$ such that $C_{ACS}$ may be greater than or equal to $C_{BODY}$. In this manner, $Z_{ACS}$ may be configured, for example, to be less than or equal to approximately $1/(jw(150 \text{ pF}))$ such that $C_{ACS}$ may be greater than or equal to approximately 150 pF (e.g., 240 pF).

Persons skilled in the art will appreciate that the values of capacitors 321, 341, 361, 381 and diodes 310, 330, 350, and 370 may be selected, for example, such that the total capacitance of circuit 300 never drops below the capacitance of a user's body at any point during the operation of the device. In doing so, the sensitivity of a touch sensor of the device may be increased.

From the foregoing description, persons skilled in the art will recognize that this invention provides impedance stabilization. In addition, persons skilled in the art will appreciate that the various configurations described herein may be combined without departing from the present invention. It will also be recognized that the invention may take many forms other than those disclosed in this specification. Accordingly, it is emphasized that the invention is not limited to the disclosed methods, systems and apparatuses, but is intended to include variations to and modifications thereof which are within the spirit of the following claims.

What is claimed is:

1. An AC-to-DC power adapter comprising:
   a first diode coupled in parallel with a first stabilization circuit;
   a third diode coupled in parallel with a third stabilization circuit, wherein said first and third diodes are coupled in series at a first input terminal;
   a second diode coupled in parallel with a second stabilization circuit; and
   a fourth diode coupled in parallel with a fourth stabilization circuit, wherein said second and fourth diodes are coupled in series at a second input terminal, and wherein each of the first, second, third, and fourth stabilization circuits comprise at least a resistor and a capacitor coupled in series.

2. The AC-to-DC power adapter of claim 1, wherein said first input terminal and second input terminal receive signals from a two-prong jack.

3. The AC-to-DC power adapter of claim 1, wherein said first and third diodes are coupled in series and said second and fourth diodes are coupled in series.

4. The AC-to-DC power adapter of claim 1, wherein said first and fourth diodes are coupled in series at a first node, said second and third diodes are coupled in series at a second node, and a capacitor is coupled between said first and second nodes.

5. The AC-to-DC power adapter of claim 1, wherein said first stabilization circuit comprises a first capacitor.

6. The AC-to-DC power adapter of claim 1, wherein said first stabilization circuit comprises a first resistor.

7. The AC-to-DC power adapter of claim 1, wherein said first stabilization circuit comprises a first capacitor and a first resistor.

8. The AC-to-DC power adapter of claim 1, wherein said first stabilization circuit comprises a first capacitor, said second stabilization circuit comprises a second capacitor, said third stabilization circuit comprises a third capacitor, and said fourth stabilization circuit comprises a fourth capacitor.

9. The AC-to-DC power adapter of claim 1, wherein said first stabilization circuit comprises a first capacitor and a first resistor, said second stabilization circuit comprises a second capacitor and a second resistor, said third stabilization circuit comprises a third capacitor and a third resistor, and said fourth stabilization circuit comprises a fourth capacitor and a fourth resistor.

10. The AC-to-DC power adapter of claim 1, wherein said first and fourth diodes are coupled in series at a first node, said second and third diodes are coupled in series at a second node, a capacitor is coupled between said first and second nodes, and the first winding of a transformer is coupled, via switching circuitry, to said first and second nodes.

11. The AC-to-DC power adapter of claim 1, wherein said first, second, third, and fourth diodes are included in a rectification circuit for rectifying an incoming AC signal.

12. The AC-to-DC power adapter of claim 1, wherein said first, second, third, and fourth diodes are included in a rectification circuit for rectifying an incoming AC signal and a transformer is provided to step-down said rectified incoming AC signal.

13. A system comprising:
   an AC-to-DC adapter comprising:
      a bridge diode network, having a plurality of diodes, for rectifying a received AC signal; and
      a transformer for stepping-down a received rectified signal, wherein the capacitance of said AC-to-DC adapter is at least approximately 150 pF when all of said plurality of diodes in said bridge diode network are reverse-biased; and
   a touch-sensitive device comprising a touch sensor, said touch-sensitive device powered by said AC-to-DC adapter, wherein said touch-sensitive device employs a frequency-hopping algorithm such that said touch sensor operates at a plurality of modulation frequencies, wherein a switching frequency of said AC-to-DC adapter is based on a frequency that said frequency-hopping algorithm utilizes to operate.

14. The system of claim 13, wherein the capacitance of said AC-to-DC adapter is approximately 240 pF when all of the diodes in said bridge diode network are reverse-biased.

15. The system of claim 13, wherein a switching frequency of said AC-to-DC adapter comprises at least one of said plurality of modulation frequencies that said frequency hopping algorithm operates at.

16. The AC-to-DC power adapter of claim 1, wherein said resistor exhibits a lower impedance than an impedance exhibited by said capacitor at a frequency of power that is supplied to said AC-to-DC adapter.

* * * * *